US012060213B2

(12) United States Patent
Grünenfelder et al.

(10) Patent No.: US 12,060,213 B2
(45) Date of Patent: Aug. 13, 2024

(54) CARTRIDGE FOR MULTI-COMPONENT MATERIALS

(71) Applicant: Sulzer Mixpac AG, Haag (CH)

(72) Inventors: Ralf Grünenfelder, Wangs (CH); Eberhard Remo, Maienfeld (CH); Hayden Turner, Ayer, MA (US)

(73) Assignee: MEDMIX SWITZERLAND AG, Haag (CH)

(*) Notice: Subject to any disclaimer, the term of this patent is extended or adjusted under 35 U.S.C. 154(b) by 505 days.

(21) Appl. No.: 17/419,887

(22) PCT Filed: Dec. 13, 2019

(86) PCT No.: PCT/EP2019/085088
§ 371 (c)(1),
(2) Date: Jun. 30, 2021

(87) PCT Pub. No.: WO2020/141058
PCT Pub. Date: Jul. 9, 2020

(65) Prior Publication Data

US 2022/0081182 A1 Mar. 17, 2022

(30) Foreign Application Priority Data

Jan. 3, 2019 (DE) ........................ 202019100016.3

(51) Int. Cl.
*B65D 81/32* (2006.01)
*B05C 17/005* (2006.01)
*B05C 17/01* (2006.01)

(52) U.S. Cl.
CPC ...... *B65D 81/325* (2013.01); *B05C 17/00559* (2013.01); *B05C 17/01* (2013.01)

(58) Field of Classification Search
CPC .. B65D 81/325; B05C 17/00559; B05C 17/01
See application file for complete search history.

(56) References Cited

U.S. PATENT DOCUMENTS 4,690,306 A * 9/1987 Staheli ................ B05C 17/0123 222/137
5,295,613 A 3/1994 Barthomeuf et al.
(Continued)

FOREIGN PATENT DOCUMENTS

DE 25 21 392 A1 11/1976
DE 29 18 121 A1 11/1979
(Continued)

OTHER PUBLICATIONS

German Search Report issued Jul. 25, 2019 in corresponding German Patent Application No. 20 2019 100 016.3 (with English Translation of Categories of Cited Documents).
(Continued)

*Primary Examiner* — Bob Zadeh
(74) *Attorney, Agent, or Firm* — GLOBAL IP COUNSELORS, LLP

(57) ABSTRACT

A cartridge for a multi-component material, includes a hollow cylindrical inner body which defines an inner space for receiving a first component, a hollow cylindrical outer body which receives the inner body such that an intermediate space for receiving a second component is formed between an outer wall of the inner body and an inner wall of the outer body, an outlet emanating from the inner body and in a first passage which connects an outlet opening of the outlet to the interior of the inner body is formed, and a second passage connecting the outlet opening of the outlet to the intermediate space present between the outer body and the inner body. An end portion of the inner space that faces the outlet lies at least substantially in the same plane as an end portion of the intermediate space that faces the outlet.

20 Claims, 3 Drawing Sheets

(56) References Cited

U.S. PATENT DOCUMENTS

| | | | | | |
|---|---|---|---|---|---|
| 5,339,992 | A | | 8/1994 | Barthomeuf et al. | |
| 5,405,056 | A | | 4/1995 | Mills | |
| 5,566,860 | A | * | 10/1996 | Schiltz | B05C 17/00513 222/137 |
| 5,647,510 | A | * | 7/1997 | Keller | B05C 17/00513 222/105 |
| 7,306,126 | B2 | * | 12/2007 | Brugner | B05C 17/00553 222/485 |
| 2006/0180598 | A1 | * | 8/2006 | Ritter | B65D 81/325 222/137 |
| 2008/0121653 | A1 | * | 5/2008 | Zakrzewski | B65D 35/22 222/94 |
| 2016/0045928 | A1 | | 2/2016 | Frey | |

FOREIGN PATENT DOCUMENTS

| | | | | | |
|---|---|---|---|---|---|
| DE | 692 04 232 | T2 | | 5/1996 | |
| DE | 203 11 287 | U1 | | 12/2004 | |
| DE | 10 2007 051 968 | A1 | | 5/2009 | |
| DE | 10 2008 013 083 | A1 | | 9/2009 | |
| DE | 102008013083 | A1 | * | 9/2009 | B65D 81/3227 |
| DE | 10 2009 016 943 | A1 | | 10/2010 | |
| EP | 0 213 073 | A1 | | 3/1987 | |
| EP | 0502519 | A2 | * | 9/1992 | |
| EP | 1 679 126 | A1 | | 7/2006 | |
| GB | 2276365 | | * | 9/1994 | |
| JP | 07098546 | B2 | * | 10/1995 | |
| WO | 95/05984 | A2 | | 3/1995 | |
| WO | 2005/095225 | A1 | | 10/2005 | |

OTHER PUBLICATIONS

International Search Report issued Feb. 26, 2020 in corresponding International Patent Application No. PCT/EP2019/085088, filed Dec. 13, 2019 (with English Translation).

* cited by examiner

CARTRIDGE FOR MULTI-COMPONENT MATERIALS

CROSS-REFERENCE TO RELATED APPLICATIONS

This application is a U.S. National Stage application of International Application No. PCT/EP2019/085088, filed Dec. 13, 2019, which claims priority to German Patent Application No. 20 2019 100 016.3, filed Jan. 3, 2019, the contents of each of which are hereby incorporated herein by reference.

BACKGROUND

Field of the Invention

The present invention relates to a cartridge for a multi-component material and comprises a hollow cylindrical inner body which defines an inner space for receiving a first component of the multi-component material and a hollow cylindrical outer body which receives the inner body in its interior in such a way that an intermediate space for receiving a second component of the multi-component material is formed between an outer wall of the inner body and an inner wall of the outer body.

Background Information

Conventional cartridges for multi-component materials, which are also known as multi-component cartridges, are generally known and are, by way of example, used together with a manually actuatable dispensing apparatus for the purpose of dispensing a multi-component material or also for dispensing a single component material. For this purpose, the cartridge typically comprises an outlet for dispensing the respective component of the multi-component material.

Multi-component materials are used in a plethora of fields of applications which range from medical applications, as well as dental applications to industrial applications, such as, for example the use of adhesives for the mutual fastening of components or of protective coatings respectively of coatings of buildings or vehicles. For example, the multi-component material can be a two-component adhesive which comprises a binder and a hardener. Multi-component cartridges are available with different filling and/or mixing ratios, such as, for example 1:1, 2:1, 4:1, 10:1 and the like.

Since a cartridge manufacturer does not necessarily also produce the multi-component material that is to be received by the cartridge, frequently empty cartridges are made available for the manufacture of a multi-component material who then fills the made available cartridges with a corresponding multi-component material.

SUMMARY

It has been determined that when back-side filling a multi-component material (i.e., filling the cartridge from the side remote from the outlet), problems can arise on venting respectively on removing excess air. These problems can influence the shelf life of the components received in the cartridge. Moreover, the correct introduction of a piston can lead to problems such that a incorrectly introduced piston can likewise have the consequence of a reduced shelf life of the materials stored in the cartridge. For this reason, it has been determined that it is preferable to fill the cartridge from the front (i.e., from the outlet side) in order to avoid the mentioned problems in connection with the venting of the air enclosed in the cartridge, as well as of the incorrect placement of the piston.

A further disadvantage of multi-component cartridges in the state of the art is present with respect to the comparatively large dispensing force which has to be used for the dispensing of the material and which makes the dispensing thereof more difficult. A further disadvantage consists therein that a non-negligible amount of the material remains within a dead volume of the cartridge after the dispensing. The last-mentioned disadvantage is insofar particularly undesirable, since the outer dimensions of the cartridge, this means their diameter and length and thus the maximum filling volume of the same are defined by the dimensions of the commercially available dispensing apparatus in such a way that one should avoid any remaining residue.

By way of example, the EP 1 679 126 B1 discloses a multi-component cartridge which is configured to be used with a commercially available hand actuatable dispensing apparatus. The cartridge of the EP 1 679 126 B1 is configured in such a way that this achieves a compromise between a (maximum possible) filling volume respectively a maximum possible receiving capacity of the cartridge and a remaining rest volume and/or non-usable dead volume in the cartridge. In order to achieve this compromise a two-part piston arrangement is used and the chambers of the cartridge are arranged in a receiving position one after another with respect to a longitudinal axis of the cartridge.

Due to the comparatively complex assembly of the cartridge in effort and cost, this means due to the two-part piston, whose two components are separated from one another in an axial direction by the length of the first chamber, as well as the components cooperating therewith, the maximum (possible) filling volume is reduced and it is generally also not possible to simultaneously fill the different components, but rather they have to be filled one after the other which not only makes their manufacture more demanding in effort and cost, but also has the consequence of an increased filling time.

In view of these aforementioned disadvantages, it is an object of embodiments of the present invention to increase the available filling volume of a multi-component cartridge and to preferably, at the same time, still further reduce the remaining residual volume in the cartridge of a cartridge filled from the front side. It is a further object of embodiments of the invention to reduce the dispensing force during the dispensing process in order to improve the handling of a multi-component cartridge. Yet a further object of embodiments of the invention lies therein to make available a multi-component cartridge which can be assembled and manufactured in a cost-effective and simple manner. It is moreover an object of embodiments of the invention to connect an inner body and an outer body of a cartridge of the initially named kind securely and fixedly to one another.

These objects are satisfied by a cartridge having the features disclosed herein.

The cartridge in accordance with an embodiment of the invention for a multi-component material comprises a hollow cylindrical inner body which defines an inner space for receiving a first component of the multi-component material, a hollow cylinder outer body which receives the inner body in its interior in such a way that an intermediate space is formed between an outer wall of the inner body and an inner wall of the outer body for receiving a second component of the multi-component material and an outlet protruding from the inner body in which a first passage is formed which connects an outlet opening of the outlet to an inner space of the inner body and a second passage which connects the outlet opening of the outlet to the intermediate space present between the outer body and the inner body, wherein an end section of the intermediate inner space facing the outlet at least essentially lies in the same plane or lies in the same plane as an end section of the intermediate space facing the outlet.

Embodiments of the invention can be based on the general idea that the filling volume of a cartridge for a multi-component material can be increased and at the same time a non-usable residual volume remaining in the cartridge can be reduced in that the cartridge has an outlet that protrudes from an inner body received within a hollow cylindrical formed outer body. This is of advantage when the outlet directly projects from the inner body and is integrally formed with the inner body.

Through such a configuration of the cartridge, the advantage results that the cartridge as a whole has a simple construction which is moreover advantageous with respect to the manufacturing costs. Moreover, due to the simple assembly of the cartridge, a dispensing force that has to be applied for a dispensing of the components reduces, in particular since an outlet opening of the cartridge is directly connected via a first passage with an inner space of the inner body, as well as via a second passage with an intermediate space formed between the outer body and the inner body in such a way that very little, or at most, only very small mechanical resistance is placed in the way of the components to be dispensed.

Moreover, the direct connection of the outlet openings with the respective spaces provided for storage of the respective components, this means the space of the inner body and the intermediate space between the outer body and the inner body, has the advantage that the cartridge can be filled with the respective materials in a simple and cost-effective way from the outlet side, this means from the front, with a piston provided for the dispensing of the components already being pre-mounted in the cartridge.

The end sections of the inner space respectively of the intermediate space facing the outlet preferably bound the inlet region of the outlet, in particular directly bound the inlet region of the outlet. In other words, the end sections of the inner space transitions, in particular directly transitions into the first passage of the outlet and the end section of the intermediate space transitions, in particular directly transitions, into the second passage of the outlet. Hereby, the end sections of the inner space and of the intermediate space facing the outlet are easily accessible during a filling process of the cartridge in such a way that the inner space and the intermediate space can be filled in a simple manner, in particular simultaneously or at least with slight delay simultaneously, which enables a reduced filling time of the cartridge.

Having regard to a slight delay of the simultaneous filling initially the inner space or the intermediate space is filled with a component of the multi-component material defined for this. Subsequently with a time delay, of e.g. about 0.5 to 5 seconds, also the other, so far not filled space, this means the intermediate space or the inner space respectively, is filled with the corresponding component of the multi-component material defined for this in such a way that then both the inner space as well as the intermediate space can be filled simultaneously up until the cartridge is filled to a desired degree of filling. A delayed simultaneous filling of the cartridge not only enables a reduced filling time but also advantageously enables the cartridges to be filled as gas-free as possible, or in the best case completely gas-free, whereby the shelf life of the components of the multi-component materials stored in the cartridge can be increased.

If the end sections of the inner space and of the intermediate space facing the outlet are not present in the same plane, but at least substantially in the same plane then the respective end sections can be displaced with respect to one another in the direction of a longitudinal extension axis of the cartridge by up to 3 mm, preferably up to 2 mm. In particular the spacing of the end section of the inner space to the end section of the outer space can lie in the same dimension, such as a thickness of a front wall bounding the inner space and/or the outer space at the outlet side.

Advantageous embodiments of the invention can be found in the description and the drawings.

Both the inner body as well as the outer body can each have a longitudinal middle axis, with a longitudinal middle axis of the inner body and a longitudinal middle axis of the outer body preferably being aligned coaxially with respect to one another in such a way that one can also talk of a coaxial cartridge in this connection. Generally, the longitudinal middle axis of the inner body and of the outer body can also be arranged spaced apart in parallel to one another.

A particularly secure and solid connection between the inner body and the outer body can be achieved thereby that the inner body and the outer body are connected to one another, in particular at the outlet side, by a shape matching connection and/or force matching connection and/or with a connection having material continuity.

In this connection the connection between the inner body and the outer body can be realized in a particularly simple and cost-effective manner in that the inner body and the outer body are connected to one another by only one connection, this means a single fastening section. In this respect, it is not sufficient for a secure connection between the inner body and the outer body by a fastening section and/or a fastening point when the inner body and the outer body are only in loose contact with one another. Rather, the inner body and the outer body are preferably connected to one another via the fastening section, preferably by shape matching and/or force matching and/or with material continuity. In other words, a region in which the inner body and the outer body are in loose contact with one another, does not form a fastening section.

A particularly simple connection of the inner body and the outer body can be achieved thereby that the inner body and the outer body are advantageously connected to one another with respect to a longitudinal extension axis of the cartridge only at a common axial height. In other words, the fastening section and/or the fastening position is present at only a single axial height of the longitudinal extension axis of the cartridge.

In accordance with a further advantageous embodiment the inner body and the outer body can be connected to one another by ultrasonic welding and/or laser welding. In this respect the inner body and/or the outer body are heated so strongly in such a way that a particularly secure connection can be formed between the bodies standing in contact with one another after cooling thereof.

Such that the inner body and the outer body can be connected to one another, but also such that the intermediate space between the outer body and the inner body is closed, in particular at the outlet side, in the connected state, the inner body can have a collar extending radially outwardly from the outer wall of the inner body with respect to a longitudinal middle axis of the inner body, the collar, in particular at the outlet side, being connected to the outer body. Preferably, the collar extends from a wall bounding the inner body radially outwardly and, in the connected state, spans the intermediate space formed between the outer body and the inner body.

The collar of the inner body can be connected in a simple manner to the outer body, when a radially outwardly lying collar section is connected to a wall end section of the outer body facing the outlet. Having regard to the wall end section of the outer body, this can, for example, be an edge, in particular a cutting edge which arises when the outer body is separated from a larger unit, in particular is cut therefrom. The larger unit can, for example, be a tube from which several individual outer bodies are produced, in that the outer bodies are separated from the tube. The wall end section can, however, also bound the wall of an outer body produced by injection molding at the side of the outlet.

However, it is also plausible that not only the inner body has a collar, but also the outer body has a collar. In this connection the outer body can have a collar projecting radially inwardly from an inner wall of the outer body with respect to a longitudinal middle axis for a particularly good sealing connection between the inner body and the outer body, which collar is then connected to the radially outwardly extending collar of the inner body.

If the inner body and/or the outer body have a collar then this can be produced in a particularly simple and cost-effective way by an injection molding process.

It the outlet projects from the inner body then the outlet can have a means or device for fastening at least one further component to the cartridge. This device for fastening can, for example, be a thread, in particular an outer thread or also be a counter-piece of a bayonet closure and/or of a latching connection. The further component to be connected to the outlet can then in a corresponding analog way have a counter-thread, in particular an inner thread and/or have a complementary shaped counter-piece of the bayonet closure and/or of the latching connection. Having regard to the further component it can, for example, be a dispensing tip for the targeted application of the first and second materials dispensed from the cartridge. The dispensing tip can further comprise a mixing element which is configured to mix the first and second materials dispensed from the cartridge with one another. Moreover, the further component can also be a closure cap for closure of the outlet.

In accordance with a further advantageous embodiment, the inner body and the outer body can be connected to one another by a bayonet closure. The bayonet closure can be formed thereby that the outer body forms a sleeve section which at least sectionally receives the outlet, wherein the sleeve section has a component of the bayonet closure and the outlet has a corresponding counter-component of the bayonet closure.

A component of the bayonet closure is, for example, a spigot which in the closed state of the bayonet closure is received in a slot of a counter-component. The spigot can, for example, be configured at the outlet and the slot can be disposed at the sleeve section. However, it is also plausible to have the spigot at the sleeve section and that the slit is formed at the outlet.

Generally speaking, the inner body and the outer body cannot be connected to one another only by a bayonet closure, but also alternatively via a threaded connection. It is naturally understood that the outlet and the sleeve section then each have a corresponding thread.

If the inner body and the outer body are connected to one another by a bayonet closure then the sleeve section can have a means or device for fastening at least one further component to the cartridge. The device can then be figured in a similar manner to the previously described device for fastening which are then formed at the outlet.

Such that none of the components stored in the cartridge, in particular the component stored in the intermediate space between the outer body and the inner body, can arrive in a gap possibly present between the outlet and the sleeve section in a non-desirable manner, it is advantageous to provide a seal between the outlet and the sleeve section. Moreover, a seal between the outlet and the sleeve section can act advantageously in this respect such that no non-desirable gases or humidity can penetrate the cartridge, whereby the shelf life of the components of the multi-component material stored in the cartridge can be increased. Moreover, two or more seals arranged one after another consecutively in an axial direction with respect to the longitudinal extension axis of the cartridge also exert a guiding function in such a way that, during the assembly of the cartridge on introduction of the inner body into the outer body a canting of the inner body and the outer body is avoided or even completely prevented.

Preferably, the inner space and the intermediate space are respectively filled with a component of a multi-component material. In particular, the inner space is filled with a first component of the multi-component material in contrast to which the intermediate space can be filled with a second component of the multi-component material.

Typical multi-component materials are, for example construction materials, sealing materials and/or sealing off materials, connection materials, joining materials, in particular two-component adhesives, protective materials, coating materials, as well as paints. Thus, the cartridge can be used for a plurality of fields of applications, such as, for example in the industrial field for the production of goods, and also for the repair or maintenance of already produced goods. Moreover, the cartridge can be used in the construction field, in the automotive and/or aircraft industry, in the field of energy, for example for wind turbines, and the like. Furthermore, also a use of the cartridge in the medical field, dental filed or veterinary field is plausible.

For dispensing of the components of the multi-component material stored in the cartridge, a piston is preferably provided which dispenses the components of the multi-component material stored in the inner space of the inner body, as well as in the intermediate space can be formed between the outer body and the inner body via the outlet upon movement of the piston in the direction of the outlet. Moreover, a peeling apparatus can be provided which peels a wall bounding the inner body with regard to the longitudinal middle axis of the inner body along its length and guides outwardly in the direction of the outer body. Preferably, the piston and the peeling apparatus form a component assembly. For a particularly good functioning of the peeling apparatus, the wall of the inner body is aligned, at least substantially in parallel to the longitudinal middle axis of the inner body and/or with respect to the longitudinal extension axis of the cartridge.

A particularly good handling of the cartridge with respect to its dispensing properties can be achieved thereby that the outlet is arranged either centrically or eccentrically with respect to a longitudinal extension axis of the cartridge.

The inner body and/or the outer body can be manufactured from a plastic material, such as e.g. polyethylene terephthalate (PET) or polypropylene (PP). In this connection, the inner body and the outer body can be made from the same plastic, or, however, also from different plastic materials. Preferably, the inner body and/or the outer body is/are manufactured by an injection molding process.

The invention also relates to a dispensing apparatus having the cartridge and a dispensing tip. As already mentioned, the dispensing tip can also comprise a mixing element for mixing the dispensed components of the multi-component material.

In accordance with a further aspect the present invention is also directed at a method for the manufacture of cartridge. The method of manufacture of a cartridge comprising the following steps:

- providing a hollow cylindrical inner body, for example produced by an injection molding process;
- providing a hollow cylindrical outer body, for example formed by an injection molding process;
- introducing the inner body into the outer body;
- aligning the inner body with respect to the outer body; and
- connecting the inner body to the outer body in the region of an outlet of the cartridge by a shape matching connection, and/or a force matching connection and/or a connection having material continuity.

In this connection the inner body and the outer body can be connected in a shape matching and force matching manner on carrying out the connection step of the method by a bayonet closure. However, it is also plausible that the inner body and the outer body are connected to one another in a shape matching manner and with material continuity on the connection step of the method by laser welding and/or ultrasonic welding.

It is naturally understood that the parameters used on laser welding respectively on ultrasonic welding depend on the respective materials of which the inner body respectively the outer body are formed.

Typically, upon the laser welding of mentioned plastics, lasers are used which emit radiation in the infrared range, this means having a wavelength in the range of 750 nm to 30 μm and having a power of 1 to 600 W. Such criteria are by way of example satisfied by diode lasers, fiber lasers, Nd:YAG lasers, $CO_2$ lasers or the like or similar lasers emitting in the infrared range.

During an ultrasonic welding the inner body and the outer body are connected to one another as a consequence of high frequency mechanical oscillations with typical frequencies between 20 and 260 Hz and an amplitude in the range of 0.35 to 2.0 mm as well as an impulse duration of 0.1 to 5 seconds. Since the high frequency oscillations bring about vibrations in the inner body and/or the outer body one can also talk of vibration welding on ultrasound welding.

BRIEF DESCRIPTION OF DRAWINGS

The invention will be explained in more detail hereinafter with reference to the drawings.

DETAILED DESCRIPTION

Figure 1:
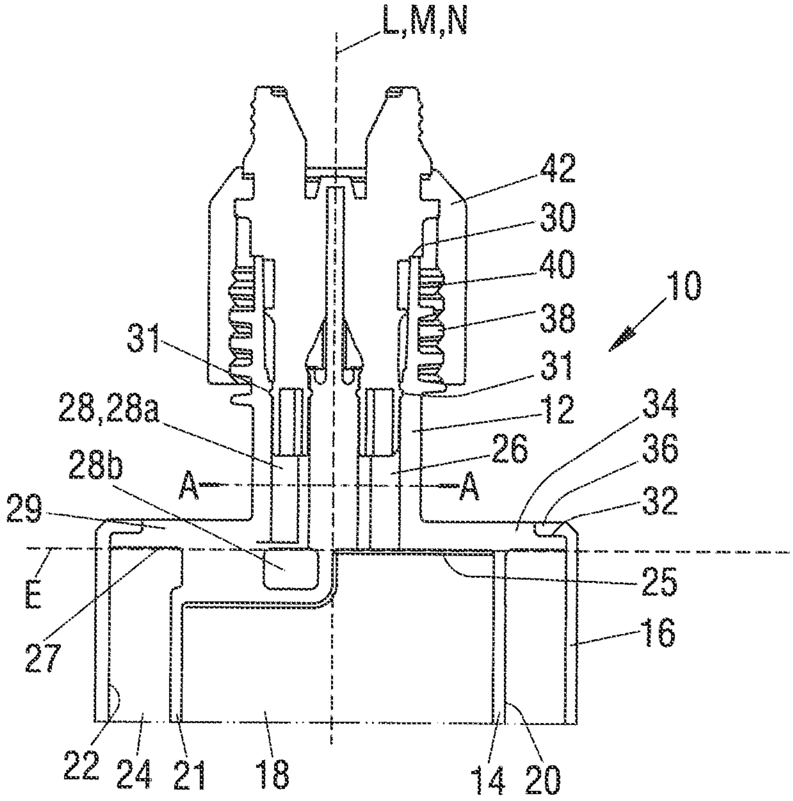
FIG. 1 is a longitudinal sectional view through a part of a cartridge in accordance with a first embodiment.
Figure 2:
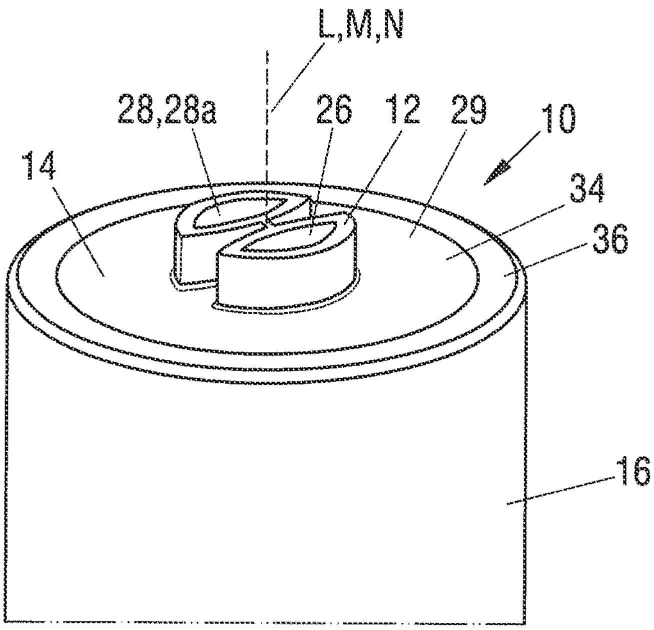
FIG. 2 is a perspective view of a part of a cartridge of FIG. 1 in which an outlet of the cartridge is sectioned along the plane A-A.
Figure 3:
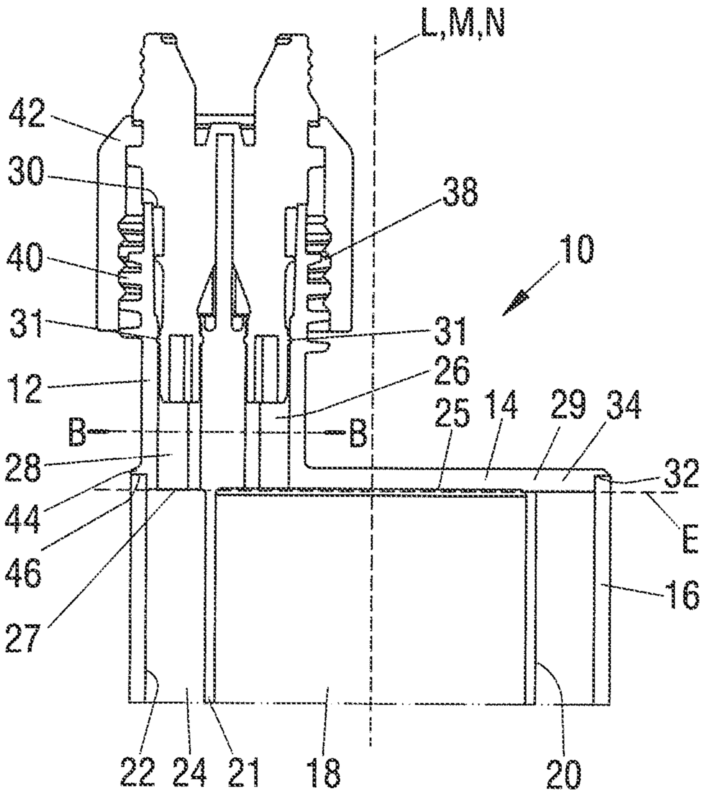
FIG. 3 is a longitudinal sectional view of a part of a cartridge in accordance with a second embodiment.
Figure 4:
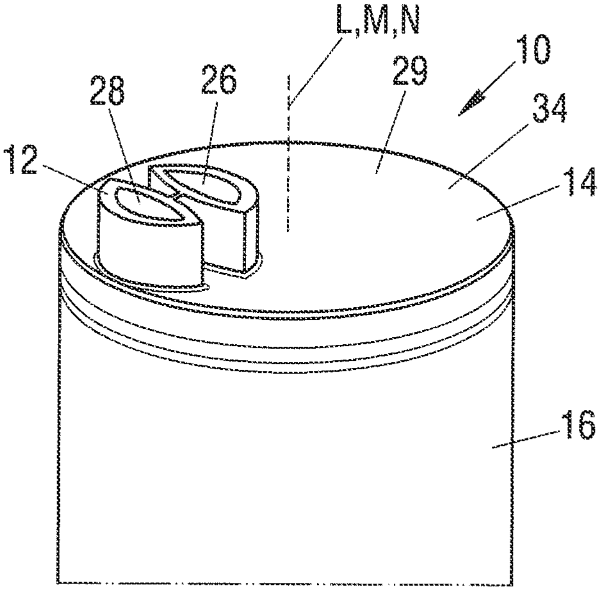
FIG. 4 is a perspective view of a part of cartridge of FIG. 3 in which an outlet of the cartridge is sectioned along the plane B-B.
Figure 5:
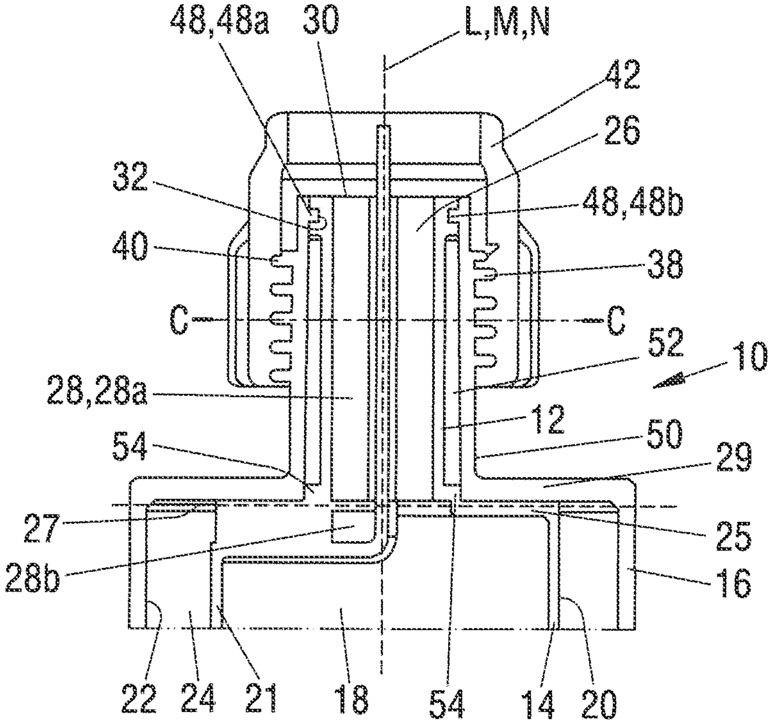
FIG. 5 is a longitudinal sectional view through a part of a cartridge in accordance with a third embodiment.
Figure 6:
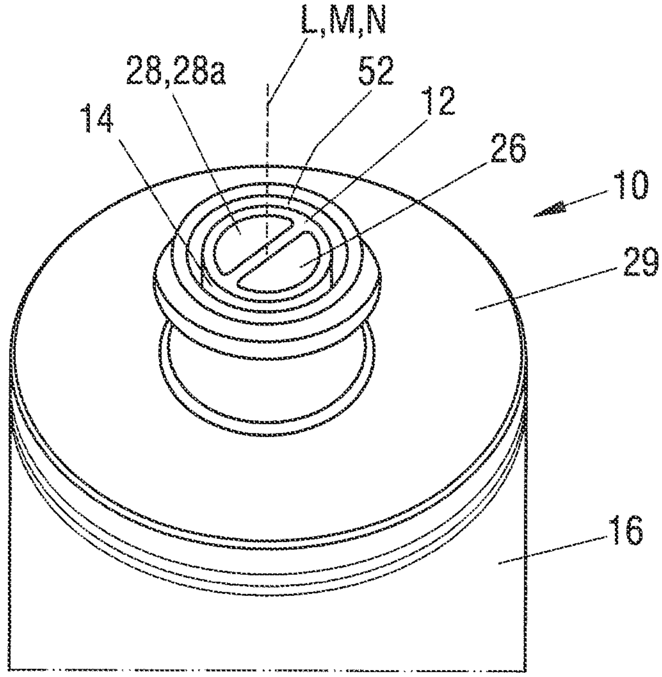
FIG. 6 is a perspective view of a part of a cartridge of FIG. 5 in which an outlet of the cartridge is sectioned along the plane C-C.

Different embodiments of a part of a cartridge 10 for a multi-component material are illustrated in the FIGS. 1 to 6. More precisely, respectively a region of an outlet 12 of the cartridge 10 is shown in the FIGS. 1 to 6. In this connection the FIGS. 1 and 2 show a cartridge 10 in accordance with a first embodiment, FIGS. 3 and 4 show a cartridge 10 in accordance with a second embodiment and FIGS. 6 and 6 show a cartridge 10 in accordance with a third embodiment.

The cartridge 10 serves for use with a dispensing apparatus not illustrated in the Figures which can have a dispensing tip for the targeted application of the components of the multi-component material dispensed from the cartridge, wherein the dispensing tip can be equipped optionally with a mixer, for example a static mixer, in particular from the company Sulzer Mixpac AG.

Hence it is evidenced, in particular with reference to the longitudinal sectional views shown in the FIGS. 1, 3 and 5 that it is common for all embodiments of the cartridges 10 that the cartridge 10 has a hollow cylindrical inner body 14, as well as a hollow cylindrical outer body 16. The inner body 14 defines an inner space 18 which serves for the reception of a non-illustrated first embodiment of the multi-component material. The outer body 16 is larger than the inner body 14 and receives the inner body 14 in a state in which they are connected to one another. In this connection, the outer body 16 receives the inner body 14 in such a way that an intermediate space 24 is formed between an outer wall 20 of the inner body 14 and an inner wall 22 of the outer body 16 which intermediate space serves for receiving a non-illustrated second component of the multi-component material. Preferably, the intermediate space 24 surrounds the inner body 14 in a ring-shaped manner respectively in a hollow cylindrical-like manner.

Moreover, an end section 25 of the inner space 18 facing the outlet 12 is at least essentially present in the same plane E like an end section 27 of the intermediate space 24 (FIG. 1 and FIG. 5) facing the outlet 12. In this connection the respective end section 25, 27 can be displaced with respect to one another in the direction of a longitudinal extension axis N of the cartridge 10 by up to 3 mm, preferably by up to 2 mm. In particular, the spacing from the end section 25 of the inner space 18 to an inner section 27 of the outer space 24 can lie in the same order of magnitude as a thickness of a front wall bounding the inner space 18 respectively the outer space 24. The end section 25 of the inner space 18 facing the outlet 12 can, however also lie in the same plane E like the end section 27 of the intermediate space 24 facing the outlet 12 (FIG. 3).

The inner space 18 and the outer space 24 are each filled with a component of the multi-component material. In this connection, the inner space 18 is by way of example filled with a first component and the intermediate space 24 is filled with a second component of the multi-component material. For better emphasis, the inner space 18 and the intermediate space 24 are illustrated without first and second components, i.e. in the non-filled state.

For dispensing the first and second components, a piston, not illustrated in the Figures, can be provided which dispenses the components of the multi-component material stored in the inner space 18 of the inner body 14, as well as in the intermediate space 24 formed between the outer body 16 and the inner body 14 via the outlet 12 on a movement of the piston in the direction of the outlet 12 and a peeling apparatus which separates a wall 21 bounding the inner body 14 with respect to a longitudinal middle axis L of the inner body 14 along its length.

As can further be recognized with reference to the longitudinal sectional views in the FIGS. 1, 3 and 5 the longitudinal middle axis L of the inner body 14 and a longitudinal middle M of the outer body 16 are arranged coaxially with respect to one another. Due to the coaxial arrangement of the longitudinal middle axis L, M the inner body 14 and/or of the outer body 16 the cartridge 10 is also referred to as a coaxial cartridge.

Each of the cartridges 10 moreover has an outlet 12 which projects from the inner body 14. The outlet 12 comprises both a first passage as well as a second passage 28. The first passage 26 connects an outlet opening 30 of the outlet 12 to the inner space 18 of the inner body 14, in contrast to which the second passage 28 connects the outlet opening 30 to the intermediate space 24 formed between the outer body 16 and the inner body 14.

Such that no component of the multi-component material can exit the cartridge in a non-allowed manner in a closed state of the cartridge 10 closed by a closure 42, but also to increase the storage capability in such a way that no gas or humidity can penetrate the cartridge, each of the passages 26, 28 can have a sealing section 31 which cooperates in a sealing manner with the corresponding closure 42 (FIG. 1 and FIG. 3).

The first passage 26 and the second passage 28 not only serves for dispensing the first and second components, but also for the filling of the inner space 18 of the inner body 14 respectively of the intermediate space 24 present between the outer body 16 and the inner body 14. In this connection the first and second passage 26, 28 are formed in such a way that a nozzle of a filling plant for filling the cartridge 10 with the respective components of the multi-component material can be introduced into these. Following the introduction of the corresponding nozzle associated with the correct passage 26, 28 of the outlet 12, the inner space 18 and the intermediate space 24 of the cartridge 10 can be filled in a simple manner from the outlet side, wherein a piston provided for the dispensing of the components can already be premounted in the cartridge 10.

In accordance with a first and third embodiment of the cartridge 10, the outlet 12 is centrically aligned with respect to the longitudinal extension axis N of the cartridge 10 (FIGS. 1 and 2 as well as 4 and 5). In contrast to this, the outlet 12 in accordance with the second embodiment of the cartridge 10 is eccentrically aligned with respect to the longitudinal extension axis N of the cartridge 10 (FIGS. 3 and 4).

With reference to FIGS. 1 and 2, a cartridge 10 in accordance with the first embodiment will be explained in more detail.

As already mentioned, the two longitudinal middle axis L, M of the inner body 14 and of the outer body 16 are coaxially arranged and the outlet 12 is centrically arranged with respect to the longitudinal extension axis N of the cartridge 10. This has the consequence that the intermediate space 24 between the outer body 16 and the inner body 14 are radially displaced with respect to the longitudinal extension axis N of the cartridge 10 radially outwardly. Such that the outlet opening 30 of the outlet 12 can still be in connection with the intermediate space 24, the second passage 28, starting from the outlet opening 30 has an axial section 28*a* aligned at least approximately in parallel to the longitudinal extension axis N of the cartridge 10, as well as a radial section 28*b* aligned at least substantially perpendicular to the longitudinal extension axis N of the cartridge 10 and opening into the intermediate space 24.

The inner body 14 and the outer body 16 of the cartridge 10 in accordance with the first embodiment are connected to one another in a shape matching manner and in particular with material continuity by only one fastening section 32. For this purpose, the inner body 14 has a collar 34 extending radially outwardly from the outer wall of the inner body 14 with respect to its longitudinal middle axis L, which collar 34 is connected with a radially inwardly extending collar 36 extending from the inner wall 22 of the outer body 16 by ultrasonic welding at the outlet side. It is understood that the collar 34 of the inner body 14 and the collar 36 of the outer body 16 can also be connected to one another by a different joining method, such as, for example by laser welding.

The fastening section 32 forms a radial peripheral welding bead with respect to the longitudinal extension axis N of the cartridge 10. As can also be recognized with reference to FIG. 1 the fastening section 32 lies at only one common axial height with reference to the longitudinal extension axis N of the cartridge 10.

Such that the cartridge 10 can be connected to a further component such as for example a closure, a dispensing tip, a mixing element or the like, the outlet 12 has a means or device 38 for fastening (e.g., a fastener) the further component. The fastening device 38 are illustrated in the embodiment in FIG. 1 in the shape of an outer thread 40 and specifically serves the purpose of connecting a screw closure 42 to the cartridge 10. Following the removal of the screw closure 42 the cartridge 10 can then be connected to a dispensing tip and/or to a mixing element. The fastening device 38, can also be configured in a different way, e.g. in the form of a bayonet closure or of a latching connection.

In the following, a cartridge 10 in accordance with a second embodiment will now be described with reference to FIGS. 3 and 4.

The cartridge 10 in accordance with the second embodiment differs from the cartridge 10 in accordance with the first embodiment essentially in the way in which the inner body 14 and the outer body 16 are connected to one another and the way in which the outlet 12 is arranged.

Specifically, the inner body 14 has a collar 34 extending radially outwardly with reference to the longitudinal middle axis L of the inner body 14 from an outer wall 20 of the inner body 14. The collar 34 having a radially outwardly lying collar section 44, which at the outlet side is connected to a wall section 46 of the outer body 16 facing the outlet 12 in a shape matching manner and in particular in a manner with material continuity, in order to form a common fastening section 32.

The fastening section 32 is likewise present like the cartridge 10 in accordance with the first embodiment at only one common axial height (FIG. 3). The fastening section 32 of the cartridge 10 in accordance with the second embodiment is a radial circumferential weld bead formed by laser welding. It is naturally understood that the inner body 14 and the outer body 16 can also be connected to one another by ultrasonic welding.

The outlet 12 of the cartridge 10 in accordance with the second embodiment is eccentrically arranged in contrast to the outlet 12 of the cartridge 10 in accordance with the first embodiment, as can be recognized with particular emphasis with reference to FIG. 3. By way of the eccentric arrangement of the outlet 12, a simple assembly of the cartridge 10 results, as both the inner space 18 of the inner body 14 as well as the intermediate space 24 between the outer body 16 and the inner body 14 are directly connected to the outlet opening 30 of the outlet 12. In this connection, in particular a radial section 28 of the second passage 28 is modifiable. Rather, both the first passage 26 as well as the second passage 38 are merely aligned in the axial direction with reference to the longitudinal extension axis N of the cartridge 10.

FIGS. 5 and 6 show a cartridge in accordance with a third embodiment. The cartridge 10 in accordance with the third embodiment differs essentially from the cartridge 10 in accordance with the first embodiment in the manner of connection of inner and outer body 14, 16. In contrast to the cartridge 10 in accordance with the first embodiment the inner body 14 and the outer body 16 are connected to one another in a shape matching and in particular in a force matching manner by a bayonet closure 48.

For the mutual attachment of the inner and outer body 14, 16 by the bayonet closure 48 the outer body 16 forms a sleeve section 50 which completely receives the outlet 12 in the illustrated embodiment. At an inner side of the sleeve section 50 facing the outlet 12, the sleeve section 50 has a first component 48*a* of the bayonet closure 48 which in the connected state of the inner and outer body 14, 16 cooperates with a corresponding second counter component 48 of the bayonet closure 48 formed at the outlet 12.

In the connected state of inner and outer body 14, 16, the bayonet closure 48 forms a common fastening section 32 which is present at only one common axial height with reference to the longitudinal extension axis N of the cartridge 10.

Such that the cartridge 10 in accordance with the third embodiment can be connected to a further component, such as for example a closure, a dispensing tip, a mixing element or the like, the sleeve section 50 has a means or device 38 for fastening (e.g., a fastener) the further component. In the illustrated embodiment the fastening device 38 is present in the form of an outer thread 40 which serves for the fastening of a closure 42 in the form of a screw closure. It is naturally understood that the fastening device 38 can also be configured in the form a bayonet closure or of a snap connection.

In the following it will be described how the inner body 14 is connected to the outer body 16 in order to form a cartridge 10. Initially, the inner body 14 is introduced in the outer body 16 in such a way that the inner body 14 and the outer body 16 are brought into contact with one another. Then, the inner body 14 and the outer body 16 are correctly aligned with respect to one another. Subsequently, the inner body 14 and the outer body 16 are fixedly connected to one another. This takes place with the cartridge 10 in accordance with the first and second embodiment thereby that the inner body 14 and the outer body 16 are connected to one another by way of laser welding and/or ultrasonic welding in a shape matching manner with material continuity. Having regard to the cartridge 10 in accordance with the third embodiment the inner body 14 and the outer body 16 are rotated with respect to one another about the longitudinal extension axis N of the cartridge 10 in such a way that the bayonet closure 48 is in a latching state.

Such that components stored in the cartridge 10, in particular the second components stored in the intermediate space 24 between the outer body 16 and the inner body 14 cannot arrive in a non-desirable manner in a gap 52 present between the outlet 12 and the sleeve section 50, a seal 54 is advantageously formed between the outlet 12 and the sleeve section 52. In this connection the bayonet closure 48 can likewise act in the manner of a seal 54.

The invention claimed is:

1. A cartridge for a multi-component material, comprising:

a hollow cylindrical inner body defining an inner space configured to receive a first component of the multi-component material;

a hollow cylindrical outer body configured to receive the inner body in an interior thereof such that an outer wall of the inner body and an inner wall of the outer body form an intermediate space configured to receive a second component of the multi-component material;

an outlet directly projecting from the inner body and integrally formed with the inner body in which a first passage is formed, the first passage connecting an outlet opening of the outlet with the inner space of the inner body, and a second passage connecting the outlet opening of the outlet with the intermediate space disposed between the outer body and the inner body, an end section of the inner space facing the outlet lying at least essentially in a same plane or in the same plane as an end section of the intermediate space facing the outlet;

a collar extending radially outwardly with respect to a longitudinal middle axis of the inner body from the outer wall of the inner body connected to the outer body at the outlet side; and a collar extending radially inwardly from the inner wall of the outer body with respect to a longitudinal middle axis of the outer body connected with the collar of the inner body extending radially outwardly extending.

2. The cartridge in accordance with claim 1, wherein the longitudinal middle axis of the inner body and the longitudinal middle axis of the outer body are arranged coaxially with respect to one another.

3. The cartridge in accordance with claim 1, wherein the inner body and the outer body are connected to one another by a form fit or a force fit or with material continuity at the outlet side.

4. The cartridge in accordance with claim 1, wherein the inner body and the outer body are connected to one another by only one fastening section.

5. The cartridge in accordance with claim 1, wherein the inner body and the outer body are connected to one another only at one common axial height with reference to a longitudinal extension axis of the cartridge.

6. The cartridge in accordance with claim 1, wherein the inner body and the outer body are connected to one another by ultrasonic welding or laser welding.

7. The cartridge in accordance with claim 1, wherein a radially outwardly lying collar section is connected to a wall end section of the outer body facing the outlet.

8. The cartridge in accordance with claim 1, wherein the outlet has a fastener configured to fasten at least one further component to the cartridge.

9. The cartridge in accordance with claim 1, wherein the inner space and the intermediate space are each filled with a component of the multi-component material, the inner space filled with the first component and the intermediate space is filled with the second component of the multi-component material.

10. The cartridge in accordance with claim 9, wherein a piston configured to dispense the first and second components of the multi-component material stored in the inner space of the inner body and in the intermediate space formed between the outer body and the inner body via the outlet upon movement of the piston in a direction of the outlet and a peeling apparatus configured to peel a wall along a length thereof and bounding the inner space with respect to the longitudinal middle axis of the inner body.

11. The cartridge in accordance with claim 1, wherein the outlet is centrically or eccentrically arranged with reference to a longitudinal extension of the cartridge.

12. A dispensing apparatus, comprising:

the cartridge in accordance with claim 1; and a dispensing tip.

13. A cartridge for a multi-component material, comprising:

a hollow cylindrical inner body defining an inner space configured to receive a first component of the multi-component material;

a hollow cylindrical outer body configured to receive the inner body in an interior thereof such that an outer wall of the inner body and an inner wall of the outer body form an intermediate space configured to receive a second component of the multi-component material; and an outlet directly projecting from the inner body and integrally formed with the inner body in which a first passage is formed, the first passage connecting an outlet opening of the outlet with the inner space of the inner body, and a second passage connecting the outlet opening of the outlet with the intermediate space disposed between the outer body and the inner body, an end section of the inner space facing the outlet lying at least essentially in a same plane or in the same plane as an end section of the intermediate space facing the outlet, the inner body and the outer body connected to one another by a bayonet connection, the bayonet connection configured such that the outer body forms a sleeve section which at least partly receives the outlet, and the sleeve section has a component of the bayonet connection and the outlet has a corresponding counter component of the bayonet connection.

14. The cartridge in accordance with claim 13, wherein the sleeve section has a fastener configured to fasten at least one further component to the cartridge.

15. The cartridge in accordance with claim 13, wherein at least one seal is configured between the outlet and the sleeve section.

16. The cartridge in accordance with claim 13, wherein the inner body and the outer body are connected to one another only at one common axial height with reference to a longitudinal extension axis of the cartridge.

17. The cartridge in accordance with claim 13, wherein the inner space and the intermediate space are each filled with a component of the multi-component material, the inner space filled with the first component and the intermediate space is filled with the second component of the multi-component material.

18. The cartridge in accordance with claim 17, wherein a piston configured to dispense the first and second components of the multi-component material stored in the inner space of the inner body and in the intermediate space formed between the outer body and the inner body via the outlet upon movement of the piston in a direction of the outlet and a peeling apparatus configured to peel a wall along a length thereof and bounding the inner space with respect to a longitudinal middle axis of the inner body.

19. The cartridge in accordance with claim 13, wherein the outlet is centrically or eccentrically arranged with reference to a longitudinal extension of the cartridge.

20. A dispensing apparatus, comprising:

the cartridge in accordance with claim 13; and a dispensing tip.

* * * * *